W. H. RICE.
CORN SHOCKING HORSE.
APPLICATION FILED JULY 23, 1909.
943,462.
Patented Dec. 14, 1909.
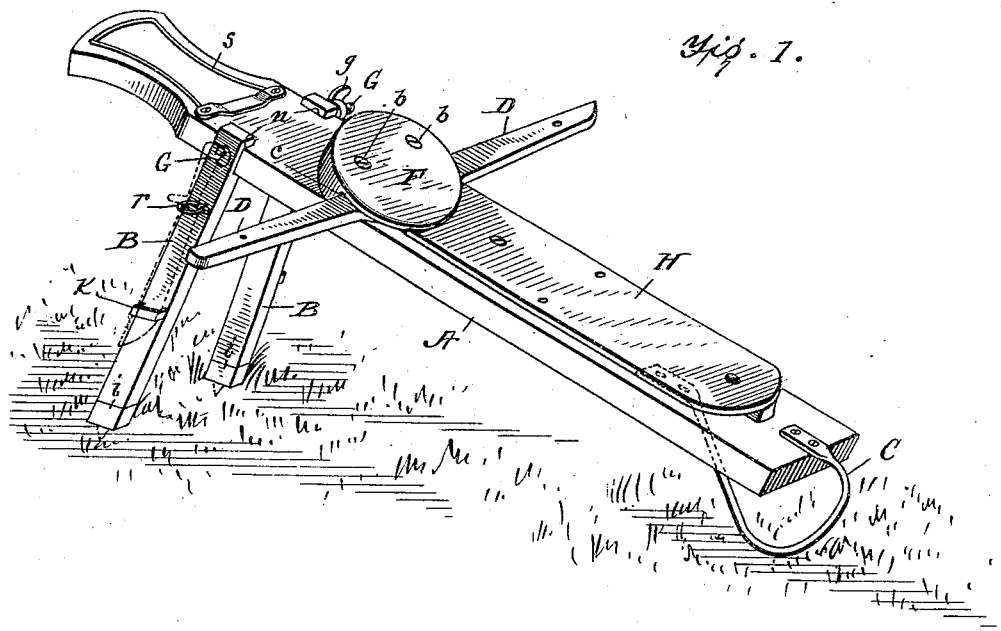
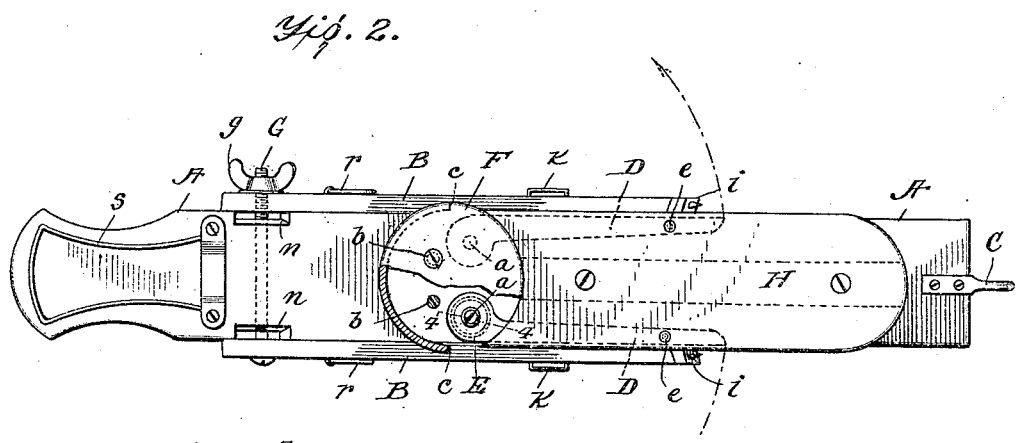
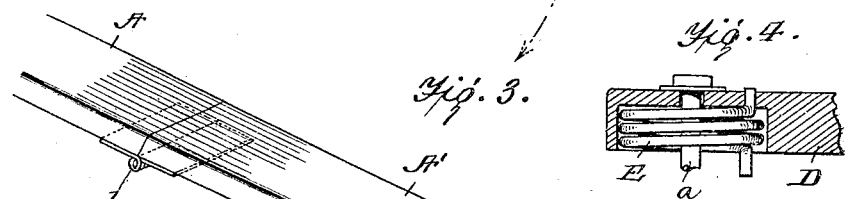
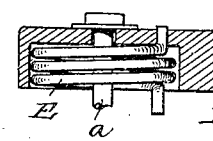
WITNESSES
L. H. Schmidt.
E. W. Byrn Jr.
INVENTOR
WILLIAM H. RICE,
BY Edw. W. Byrn.
ATTORNEY

UNITED STATES PATENT OFFICE.

WILLIAM H. RICE, OF MECHANICSBURG, PENNSYLVANIA, ASSIGNOR OF ONE-HALF TO JOHN J. MILLEISEN, OF MECHANICSBURG, PENNSYLVANIA.

CORN-SHOCKING HORSE.

943,462.  Specification of Letters Patent.  Patented Dec. 14, 1909.

Application filed July 23, 1909. Serial No. 509,224.

*To all whom it may concern:*

Be it known that I, WILLIAM H. RICE, a citizen of the United States, residing at Mechanicsburg, in the county of Cumberland and State of Pennsylvania, have invented certain new and useful Improvements in Corn - Shocking Horses, of which the following is a specification.

In the present method of harvesting corn it is customary to cut off the stalks near the ground with their burden of blades and ears and build it by armfuls into shocks which are allowed to remain standing in the field until the fodder shall have sufficiently cured and the corn hardened for husking and storage under cover. The building of these shocks is a more or less awkward job, owing to the weight and top heavy character of the stalks, and to hold the first few armfuls of the corn when being built into a shock a so-called horse has been devised consisting of a bar arranged in an approximately horizontal position on supporting legs, which bar was provided with foldable arms on the sides which arms when maintained at right angles to the bar formed four angles at the intersection of the arms with the bar, into which angles the first few armfuls of corn were stood up in starting the shock, and after the shock was finished and bound around with twine, the bar was withdrawn longitudinally from the shock, the arms folding into parallel position to the bar in this movement and permitting it to be accomplished.

My invention relates to this type of corn shocking horse and it consists in a more simple, convenient and easily operated device and one which can be compactly folded into a small compass for convenient storage or transportation as will be hereafter more fully described with reference to the drawing in which, Figure 1 is a perspective view of the horse erected for use. Fig. 2 is a plan view with the horse folded for compact storage or transportation. Fig. 3 is a detail of a modified form of support for the rear end of the horse. Fig. 4 is an enlarged section detail on line 4—4 of Fig. 2.

In the drawing, A represents a wooden bar about five or six feet long and about three by eight inches in cross section which forms the body of the horse. This bar is sustained in an inclined but nearly horizontal position in the field by means of two supporting legs B B at the front end and a runner-shaped support C at the other end. On the opposite sides of the bar A are hinged or pivoted the foldable arms D D which are so articulated upon vertical axes as to be maintained in an extended or right angular position to the bar, as seen in Fig. 1, or be folded into parallel position with the bar as seen in Fig. 2.

When the horse is erected in the field, as seen in Fig. 1, the four angles formed at the intersection of the two extended arms and the main bar constitute seats into which armfuls of the cut corn stalks are successively placed, each armful being leaned inwardly toward the center so as to cause them to converge toward the top to be mutually bracing in forming the shock. After the four angles are thus filled with corn, succeeding armfuls of corn are built around the same until a shock of suitable size is formed and then a twine binding is placed around the shock, and the horse withdrawn as hereinafter more fully described.

The runner-shaped support C is made of a metal bar bent around to a little more than a semicircle and having its ends flattened and bolted to the bar, one end being extended beneath and bolted to the under side of the lower or rear end of the bar and the other end of the runner support being bent over and bolted to the upper side of said bar. This runner-shaped support has an important function, in that it gives the necessary elevation to the body bar A to enable it to engage the stalks at a sufficiently high point and it also forms a supporting leg for the horse, while its peculiar runner-shaped form allows it to ride easily across the surface of the ground when the bar is withdrawn longitudinally from the shock after the latter is completed.

The foldable arms D are arranged in a plane above the top surface of the bar A, and are pivotally connected to the same, one on each side, by means of bolts *a a*. Covering the point of articulation of these arms is a separate and detachable housing F preferably of circular shape and secured to the bar by bolts or screws *b b*. This circular housing is cut away on the rear side where the arms protrude from beneath the same and the front edge of the housing extends down to contact with the bar. This leaves stop shoulders *c c* on the opposite sides of the housing against which the arms strike when extended to right angular position and by which their range of adjustment is limited and defined. Each arm is normally strained to assume a right angular position by means of springs arranged within the housing. As shown a single spiral spring E is attached at one end to each of the arms and the other end is attached to the bar so as to throw the arms outwardly, the springs being arranged to throw the arms in opposite directions. These springs may be coiled around the pivotal centers of the arms preferably on the under side of the arms as shown or be arranged in any other suitable manner.

Extending from the housing F longitudinally along the upper surface of the bar is a special form of arm housing H consisting of an oppositely rabbeted board bolted or screwed to the top of the bar, made thickest in the middle where it joins on to the bar and with its rabbeted edges overhanging on each side far enough to form pockets into which the arms when folded into parallel position are housed and protected. When the arms are thus folded into these pockets they may be retained in this compact and protected position by detachable headed pins *e* extending through the overhanging edges into holes in the arms to lock them in this position.

At the upper end of the body bar there is formed in its opposite edges notches *n n* to receive the upper ends of the legs B B which are formed to fit closely into said notches when in an upright position. Extending through the upper ends of these legs and horizontally through the bar in the center of the notches is a long clamp bolt G. This has a head at one end and a long screw thread at the other end provided with a butterfly nut *g*. When the horse is erected in the field with the legs in the notches and in upright position this nut *g* is turned up to a tight bearing to hold the legs seated in the notches and as the notches prevent the legs from turning about this bolt it forms a strong, simple and easily operated clamp to fix the legs in rigid supporting position. When, however, the horse is to be compactly folded for storage or transportation the nut is run back far enough on the long thread of the bolt to allow the ends of the legs to be pulled out of the notches far enough to be turned into parallel position against the side edges of the bar, as seen in Fig. 2, in which relation the ends of the legs bridge across the notches and are tightly clamped in compactly folded position. When both the arms and legs are thus folded, and locked in folded position the horse assumes its smallest and most compact proportions for storage and transportation and the parts are all kept in place and protected against damage or loss.

At the upper end of the body bar it is somewhat reduced in size to make a handle by which it is operated and on this part is arranged a bail-shaped clamp spring *s* which serves to hold cut lengths of twine for convenient access in binding the shock.

On one or both of the legs B of the horse are attached a loop-shaped keeper *k* and a ring *r* which are designed to form a convenient holder for a corn cutting knife as shown in dotted lines.

In modifying my invention, see Fig. 3, I may, if desired, make the body of the bar A of much greater length and with a hinged and articulated knuckle joint *l* which will allow the outer and rear member A¹ to fold in one direction underneath the main body A, but locks in alinement when straightened out. In this case the two sections of the body bar will occupy an inclined position with reference to the ground when in use and by varying the angular position of the rear member A¹ the degree of elevation of the body bar A may be varied to suit the height of the corn. To prevent the legs of the horse from slipping, their lower ends are provided with metal shoes in the form of ferrules *i* which have points or prongs that enter the earth, and the same provision is made for the end of the hinged section A¹ of the body bar as at *i*².

In making use of my invention the horse is set up in the field, as seen in Fig. 1, and the corn stalks by armfuls are set up in erect position in the four angles between the arms and the body bar, the stalks being leaned inwardly to make them brace against each other. Other armfuls of corn are then stacked around these until a shock of sufficient size is formed and then a section of twine is tied around the entire shock. The workman then takes hold of the higher handle end of the bar and forcibly pulls it longitudinally out of the shock. In this movement the runner bearing rides along on the ground and the foldable arms, yielding to the pressure of the corn stalks in the shock, fold automatically inward until they pass into the pockets beneath the overhanging arm housings. As soon as the horse is free from the shock the resilient arms automatically move outwardly again and the horse is ready to be taken to a position for a new shock.

In carrying out my invention I would have it understood that I do not confine myself to the exact construction and arrangement of apparatus shown, as these may be varied in various particulars without departing from my invention as set forth in the claims.

I claim.

1. A corn shocking horse, comprising a bar with supporting legs, said bar having on the upper side a separate housing, a pair of foldable arms hinged within the housing in a plane above the bar and a spring means within the housing for holding each arm in a laterally extended position with respect to the bar.

2. A corn shocking horse, comprising a bar with supporting legs, said bar having on the upper side a separate housing, a pair of foldable arms hinged within the housing in a plane above the bar and a spring means within the housing for holding each arm in a laterally extended position with respect to the bar, said housing being constructed with an opening in its rear portion and a closed front portion forming at the sides stops to limit the movement of and define the angular position of the arms.

3. A corn shocking horse, comprising a bar with supporting legs, said bar having on the upper side a separate housing, a pair of foldable arms hinged within the housing in a plane above the bar and a spring means within the housing for holding each arm in a laterally extended position with respect to the bar, said spring means being connected to the bar at one end and to the arm at the other and arranged to throw the arm outwardly.

4. A corn shocking horse, consisting of a bar having articulated arms at the sides thereof, a housing covering the point of articulation of the arms, a spring means arranged within the housing to hold the arms in a laterally extended position with respect to the bar and a second longitudinal housing extending along the top of the bar into which the arms may be folded.

5. A corn-shocking horse, consisting of a bar having corn supporting arms at the sides, a pair of legs at one end of the bar and a curved runner support for the other end of the bar for maintaining the bar in elevated position and allowing it to move freely over the ground when the horse is withdrawn from the shock.

6. A corn-shocking horse, consisting of a bar having corn supporting arms at the sides, a pair of legs at one end of the bar and a curved runner support for the other end of the bar for maintaining the bar in elevated position and allowing it to move freely over the ground when the horse is withdrawn from the shock, said runner support consisting of a metal bar curved to a generally semicircular form and having one end attached to the bottom of the bar and the other end bent over and secured to the top thereof.

7. A corn-shocking horse, consisting of a bar having corn supporting arms at the sides, said bar having at one end transverse notches cut in its edges, two legs having their upper edges fitted to fill said notches, a long bolt extending through both legs and the bar and provided with a clamping nut, said bolt being of a length sufficient to either clamp the legs in upright position in the notches, or permit the legs to be removed from the notches and turned into alinement with the side edges of the bar and thus bridge the notches for compact folding.

In testimony whereof I affix my signature in presence of two witnesses.

WILLIAM H. RICE.

Witnesses:
W. M. BERKSTRESSER,
JOHN C. REESER.